(12) United States Patent
De Grace et al.

(10) Patent No.: US 12,395,430 B2
(45) Date of Patent: Aug. 19, 2025

(54) DISAGGREGATION OF TIER1 DEVICES IN AN SDN USING SMARTSWITCHES

(71) Applicant: MICROSOFT TECHNOLOGY LICENSING, LLC, Redmond, WA (US)

(72) Inventors: Gerald Roy De Grace, Atlanta, GA (US); James Allen Grantham, Woodinville, WA (US); Kristina E. Moore, Redmond, WA (US); Lihua Yuan, Redmond, WA (US); Nan Ge, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 368 days.

(21) Appl. No.: 17/855,675

(22) Filed: Jun. 30, 2022

(65) Prior Publication Data

US 2023/0370377 A1    Nov. 16, 2023

Related U.S. Application Data

(60) Provisional application No. 63/342,044, filed on May 13, 2022.

(51) Int. Cl.
*H04L 45/76* (2022.01)
*H04L 49/1515* (2022.01)

(52) U.S. Cl.
CPC ......... *H04L 45/76* (2022.05); *H04L 49/1515* (2013.01)

(58) Field of Classification Search
None
See application file for complete search history.

(56) References Cited

U.S. PATENT DOCUMENTS

| | | | |
|---|---|---|---|
| 9,014,191 B1 * | 4/2015 | Mandal | H04L 45/04 370/392 |
| 2015/0023368 A1 * | 1/2015 | Connolly | H04L 12/6402 370/420 |
| 2016/0373359 A1 * | 12/2016 | Bruun | H04L 45/64 |

FOREIGN PATENT DOCUMENTS

EP    2911347 A1    8/2015

OTHER PUBLICATIONS

"Agilio OVS Software Architecture—White Paper", Retrieved From: http://web.archive.org/web/20160428150109/ https://www.netronome.com/media/redactor_files/WP_Agilio_SW.pdf, Apr. 28, 2016, 6 Pages.

(Continued)

*Primary Examiner* — Edan Orgad
*Assistant Examiner* — Raul Rivas
(74) *Attorney, Agent, or Firm* — Han Gim; Newport IP, LLC

(57) ABSTRACT

Techniques are disclosed for processing data packets and implementing policies in a software defined network (SDN) of a virtual computing environment. At least one network device is configured to disaggregate enforcement of policies of the SDN from hosts of the virtual computing environment. Tier-0 devices are communicatively coupled to network interfaces of the network device. The network device comprises a plurality of data processing units that are configured to implement functionality of the network device.

20 Claims, 19 Drawing Sheets

(56) References Cited

OTHER PUBLICATIONS

"International Search Report and Written Opinion Issued in PCT Application No. PCT/US2023/019010", Mailed Date: Jun. 29, 2023, 11 Pages. (MS# 411732-WO-PCT)
Pfaff, et al., "The Design and Implementation of Open vSwitch", In Proceedings of the 12th USENIX Symposium on Networked Systems Design and Implementation, May 4, 2015, pp. 117-130.

* cited by examiner

DISAGGREGATION OF TIER1 DEVICES IN AN SDN USING SMARTSWITCHES

CROSS-REFERENCE TO RELATED APPLICATION

This non-provisional utility application claims priority to U.S. Patent Application Ser. No. 63/342,044 entitled "DISAGGREGATION OF TIER1 DEVICES IN AN SDN USING SMARTSWITCHES" and filed on May 13, 2022, which is hereby incorporated in its entirety by reference.

BACKGROUND

A data center may house computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

One architecture for implementing cloud-based computing includes connection of a plurality of servers to what is typically referred to as top-of-rack switch or ToR. In practice, the ToR may be placed in the middle of rack in order to shorten the cable lengths. However, the functionality of the ToR remains the same, which is to provide an in-rack network switching capability.

From this point, the ToR may be connected to a plurality of Tier1 switches in a Clos configuration. If there are N Tier1 switches, then each ToR will connect at least once to all N Tier1 switches. The Tier1 may then connected in a Clos configuration to some number of larger Tier2 switches, typically covering a datacenter's worth of servers, which are then connected to even larger Tier3 switches to form a metro network. Many cloud networks use some form of Clos configuration to build out their datacenter and metro connectivity.

A SmartToR, which may generally be referred to as a SmartSwitch, may be a switch that includes functionality of one or more SmartNICs. As used herein, a SmartNIC may be a hardware-based acceleration device that may implement various ways of leveraging hardware acceleration and offloading techniques to perform a function, such as, for example, implementing tasks in hard ASIC logic, implementing tasks in soft (configurable) FPGA logic, implementing some tasks as software on FPGA software processor overlays, implementing some tasks as software on hard ASIC processors, or a combination thereof. In some embodiments, the hardware-based acceleration device may be a network communications device, such as a network interface card (NIC). Such a NIC may be referred to herein as a SmartNIC.

In one embodiment of a SmartSwitch implementation, one or more SmartSwitches may serve a plurality of servers to provide high performance or enhanced SDN networking. Additionally, virtual machines (VMs) may be dynamically associated to a SmartSwitch. A SmartSwitch may be a network switch with programmable DPUs, IPUs, EPUs, etc. with SmartNIC hardware integrated into the switch design, with a selected number of options for management. The installation of a SmartSwitch at one or more Tier1 positions in the data center architecture enable more efficient utilization of computing and networking resources. For example, the described techniques can allow for virtual computing environments to support a variety of configurations including custom hardware and hybrid architectures while maintaining efficient use of computing resources such as processor cycles, memory, network bandwidth, and power.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
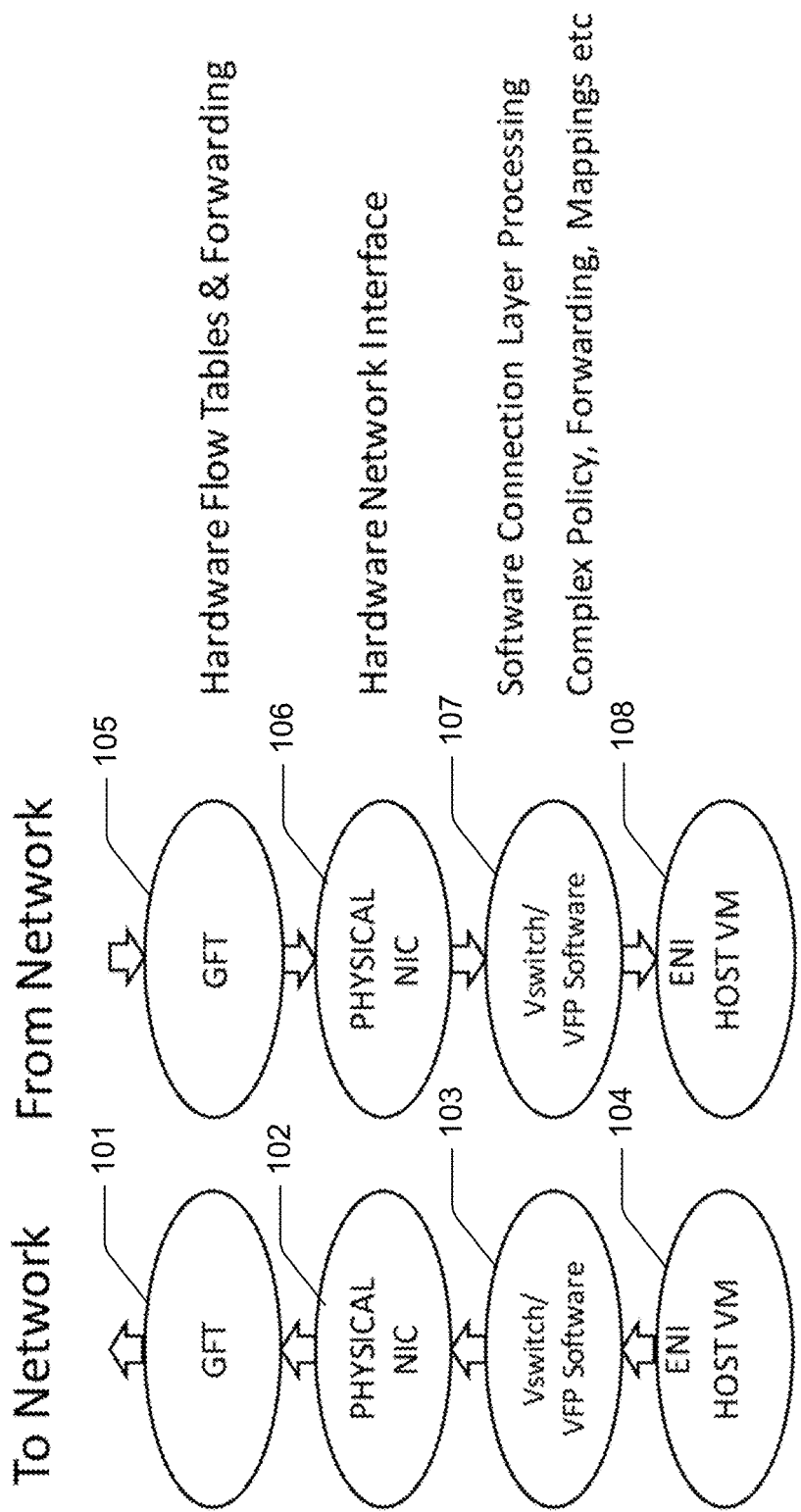
FIG. 1A is a diagram illustrating an example architecture in accordance with the present disclosure.

The disclosed embodiments enable datacenters to provide services in a manner that can enhance system flexibility and efficiency while reducing cost and complexity, allowing for more efficient use of computing, storage, and network resources. Efficient implementation of the end-to-end services by a cloud service provider can enable an experience that is seamless and more consistent across various footprints. The effective and efficient distribution of the described disaggregation and pooling techniques can be determined based on the implications for various performance and security implications such as latency and data security.

In an embodiment, a ToR switch may be enabled with SmartNICs. Such a ToR switch may be referred to as a SmartSwitch or a SmartToR. In such a SmartSwitch configuration, most if not all software defined networking (SDN) may be performed at the SmartSwitch, allowing for the servers to deploy standard NICs (NICs which do not have SmartNIC capability—which may also be referred to herein as "skinny NIC") which perform a lesser amount, if any, SDN functionality. In the disclosed embodiments, the SmartNIC functionality may be implemented in the Tier1 switches. This may be especially useful when only a fraction of the VMs of a cluster of servers require disaggregated processing of a SmartSwitch or SmartToR.

In some embodiments, no changes need to be implemented to the Clos networking design. If the SmartSwitch acts as the Tier1, then there will be no need to add the connectivity to an external SmartSwitch or other Smart Appliance. This can allow for an efficient design by removing interconnecting links or network hops that would otherwise be required to wire up a separate appliance. The number of data processing units (DPUs) in a SmartSwitch may be selected to match the expected load of the cluster of servers below the Tier1 device and can vary from one Tier1 design to another.

The disclosed embodiments may be advantageously utilized when the Tier1 device is moved to chassis-based designs. In one embodiment, DPUs in the chassis-based design may be placed into DPU cards. In an embodiment, a DPU card may comprise several DPUs.

Tier1 devices are typically deployed in sets of greater than 4 for redundancy, high availability, and resiliency. This may allow for improved high availability (HA) as compared to a Tier0 approach, where greater redundancy can be achieved in the event that one of the SmartSwitches fails.

Additionally, the bandwidth to run a cluster and the DPUs stays within the Tier1 domain and hence does not require extra Tier2 links. This can be advantageous because every Tier2 link that is consumed reduces the number of server clusters that can be deployed.

Referring to the appended drawings, in which like numerals represent like elements throughout the several FIGURES, aspects of various technologies for network disaggregation techniques and supporting technologies will be described. In the following detailed description, references are made to the accompanying drawings that form a part hereof, and which are shown by way of illustration specific configurations or examples.

In the illustrated example scenarios, SDN capabilities may be enhanced by disaggregating policy enforcement from hosts and moving it onto a SmartSwitch strategically placed in the network. Software defined networking (SDN) is conventionally implemented on a general-purpose compute node. The SDN control plane may program the host to provide core network functions such as security, virtual network, and load balancer policies.

The disclosed technologies may be part of a set of systems and technologies that aim to improve network performance to cloud applications through implementation of APIs and object models describing network services for the cloud. Such technologies may enable optimization of network performance and hardware/software technology to improve stateful connection performance. Example applications include NIC on a host, a SmartSwitch as disclosed herein, network disaggregation, and high-performance network appliances.

In some implementations that use a rack level switch such as a top-of-rack (ToR) switch and higher tier network switches, the disclosed SmartSwitch may incorporate the capability to perform data traffic transforms and may be placed at various Tier1 locations in the network. The SmartSwitch can be used to provide transformations and connectivity. The SmartSwitch can accept policies that perform packet transformations. The traffic sent by workloads can be directed through the SmartSwitch, which can apply policies and perform transformations on the traffic and send the traffic to their destination.

Since SmartSwitches can become a single point of failure for software defined networks, mitigation of faults for SmartSwitches may take into account the preservation of transient states (for example, TCP flow state) as well as the locality of the state within the individual SmartSwitches.

The described embodiments may support, for example, connected devices such as FPGAs on SmartSwitches in multiple different network and physical topologies.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

The functionality of the DPU engines within a SmartSwitch may provide a bump-in-wire where SDN policies and transformations for the cloud may be implemented. The bump, which may refer to a hop in a network path, does not add significant latency for packets that would have traveled in the same path due to routing. For example, if a packet stays within a compute row, the packet normally travels through the Tier1 switching complex to get from one rack to the other. Also, if the packet is to leave the cluster, the packet would likewise have to traverse the Tier1 switch. The actual latency of a DPU may be around 2 usec or less in practice, whether it is located on the server or the switch.

SmartSwitches may be designed to handle VMs that require a high amount of connection performance. A typical Tier1 device with 1.6 Tbps of DPU each can handle all of these high performant VMs and have spare capacity. The actual capacity of the DPUs may change depending on the desired performance. If it is desired to change an existing deployment that was not implemented with high performant DPU technology to incorporate a SmartSwitch, there would thus be little additional delay other than the aforementioned latency to travel to the SmartSwitch and back.

New cluster types may be identified to further deploy SmartSwitches to create new services. Some examples of cluster types may include graphics processing unit (GPU), artificial intelligence (AI), high performance compute (HPC), or bare metal compute clusters. Such clusters may benefit from having their own dedicated SmartSwitch complex in the Tier1/Tier0 architecture. Each of these cluster types can benefit from high performant virtualization enabled by the technologies disclosed herein. By using SmartSwitches at the Tier1/Tier0 part of the network, any VM in the fleet that access these high performance compute applications can benefit. For example, a GPU cluster can now be virtualized such that the transactions per second entering/leaving the GPU cluster per VM can be programmed from hundreds of thousands of transactions per second to even millions of transactions per second. This creates new opportunities for services that may be referred to as virtualized GPU services. Similar opportunities may be enabled for virtualized AI, virtualized high speed compute, virtualized bare metal, etc., thus enabling different business units to optimize performance for their particular technologies.

In all of these cases, the cluster inherently designed for high transaction rates can highly benefit from SmartSwitches that enable any VM in the fleet to simply bypass all SDN network processing on a native server and instead be tunneled to the dedicated SmartSwitches in the cluster. The SmartSwitches in the cluster may in turn process connections and associated packets that enter/leave the cluster. This provides flexibility for existing VMs to enter into these new services and extend their life for years beyond what may have been planned.

When DPUs are in line with normal networking paths, there is no added latency as compared to providing the same processing on the server. This allows the bump-wire-processing to be placed in the tiers of a cluster or in fact, in the Tier0/Tier1 of another cluster that dedicates the high speed SDN processing to tasks that run on its own cluster.

Figure 1B:
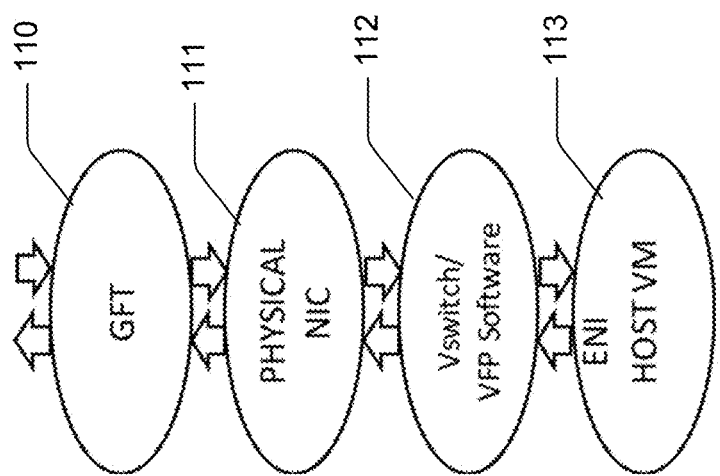
FIG. 1B is a diagram illustrating an example architecture in accordance with the present disclosure.

With reference to FIG. 1A, illustrated is an example of typical processing flows to a network and from a network. Traffic from a network may be processed with flow tables 105 and forwarded to their destination. The forwarded traffic is received at physical NICs 106 at their destination, where the traffic may be processed by virtual switches 107. The processed traffic may be sent to virtual interfaces at a host VM 108. The reverse process is shown in operations 101, 102, 103, and 104. FIG. 1B illustrates the processing shown in FIG. 1A in a bidirectional view.

Figure 1C:
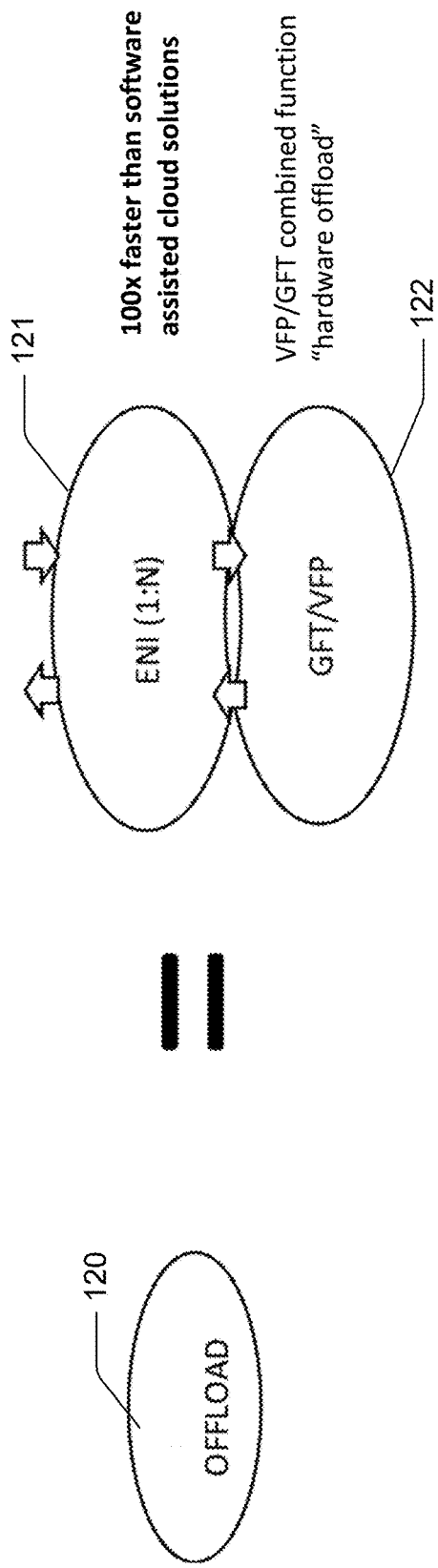
FIG. 1C is a diagram illustrating an example architecture in accordance with the present disclosure.

With reference to FIG. 1C, offload of functionality 120 to accelerator hardware may include processing 122 of GFTs and processing performed by a VFP and input/output processing by the elastic network interface (ENI) 121.

Figure 1D:
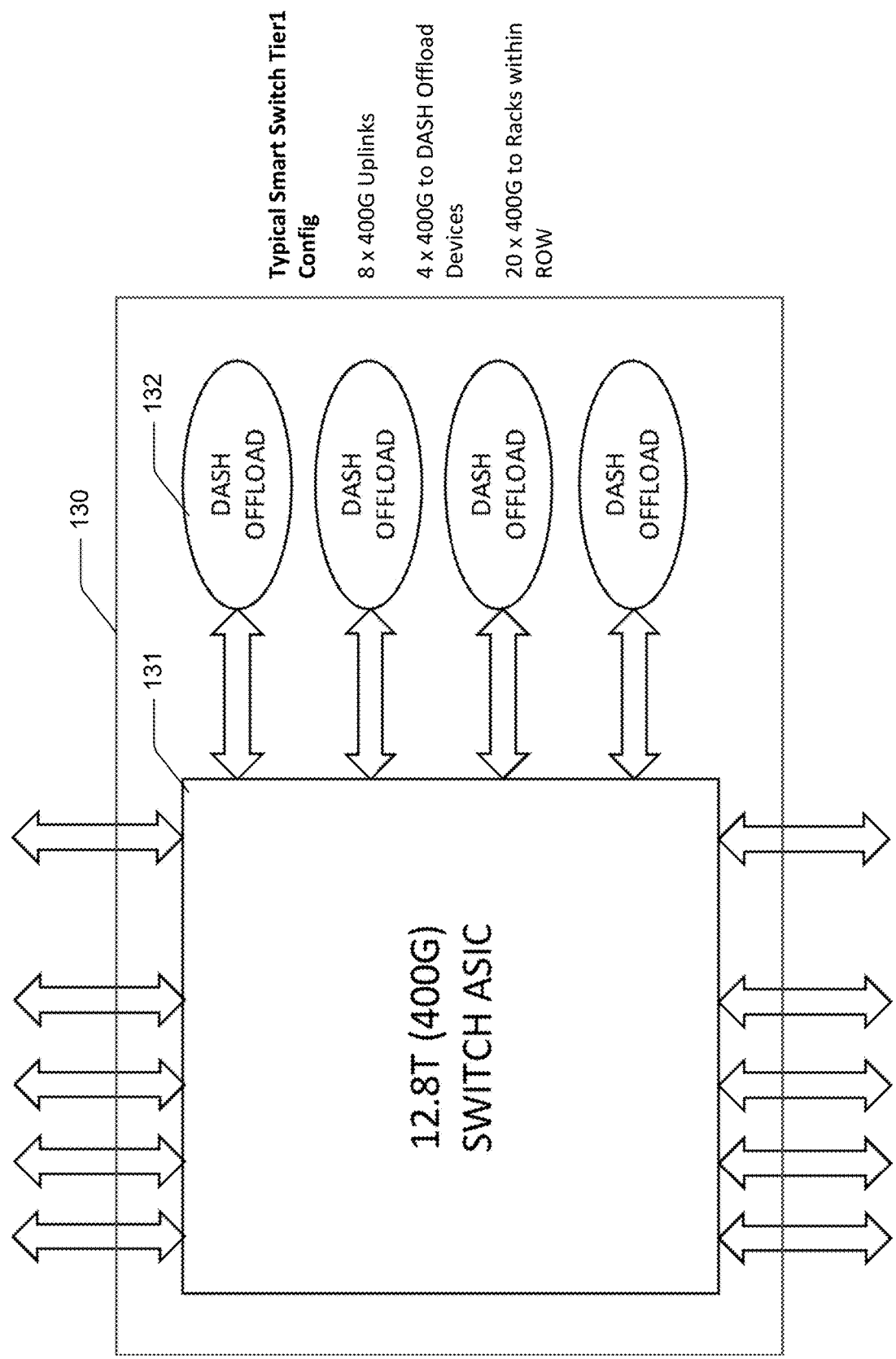
FIG. 1D is a diagram illustrating an example architecture in accordance with the present disclosure.

FIG. 1D illustrates an example of a SmartSwitch 130 with a switch ASIC 131 configured to perform offload processing 132. A number of offloads may be configured. The example SmartSwitch 130 includes one example implementation with a number of 400 Gb uplinks, and a number of connections to racks for connecting to servers.

Figure 1E:
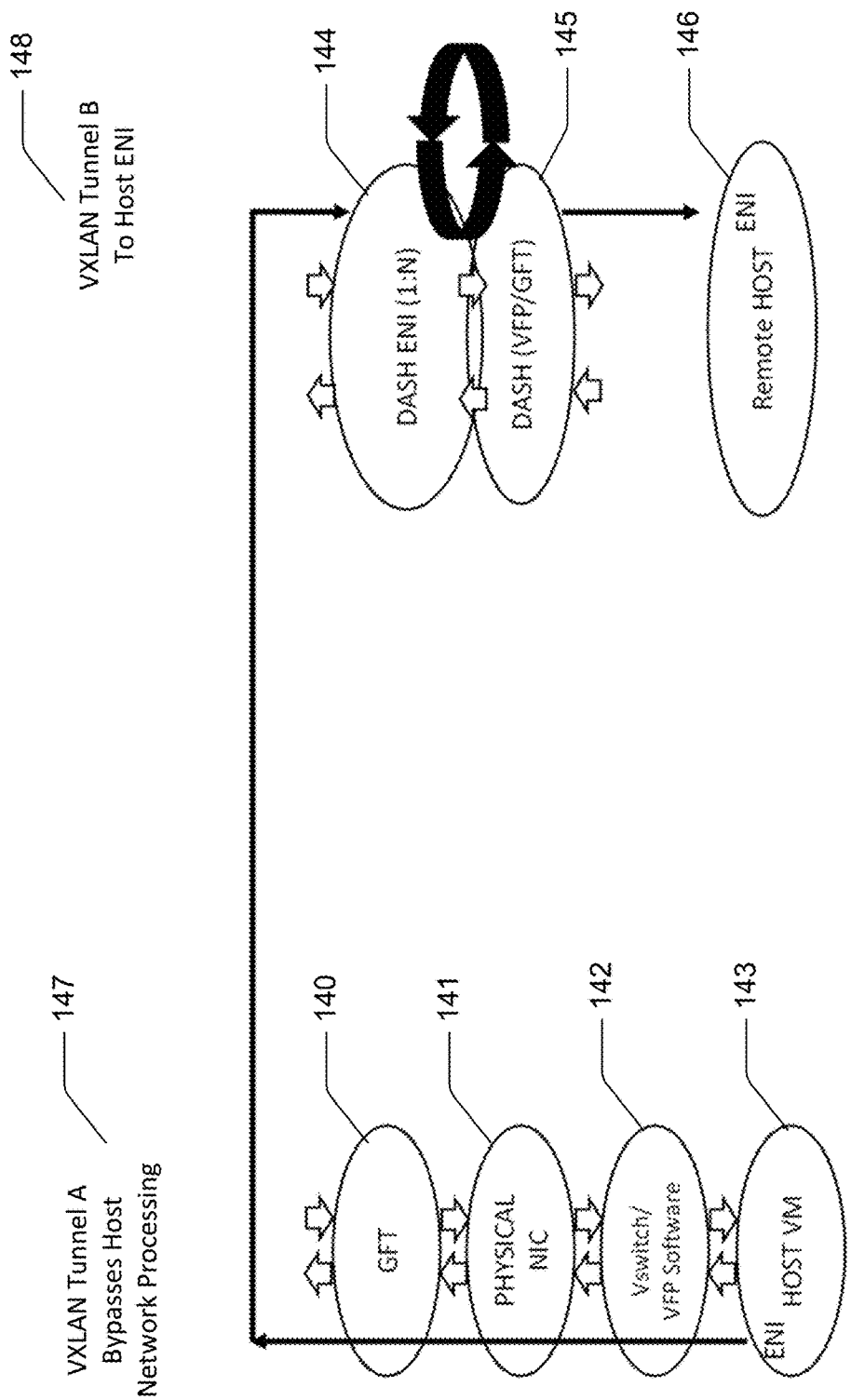
FIG. 1E is a diagram illustrating an example architecture in accordance with the present disclosure.

FIG. 1E illustrates an example implementation of the use of logical connections, such as a VXLAN tunnel, that allows for data traffic to bypass processing on the host. The ENI at host VM 143 may have a VXLAN Tunnel A 147 starting from the host VM 143 that bypasses the Vswitch/NFP 142, physical NIC 141, and GFT 140. The VXLAN Tunnel B 148 may bypass ENI 144 and VFP/GFT 145 at the remote host, and end at the ENI 146 at the remote host.

Figure 2A:
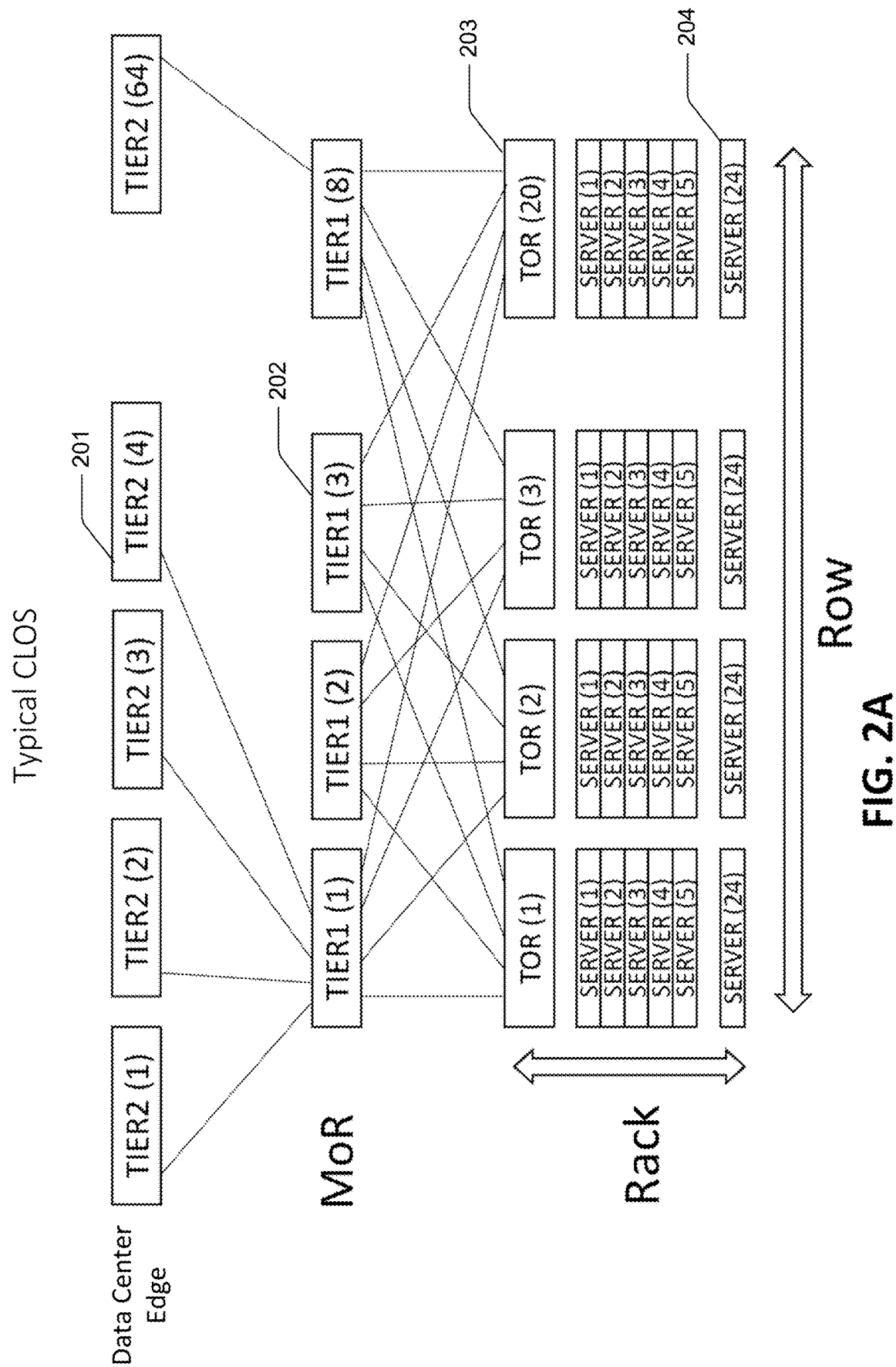
FIG. 2A is a diagram illustrating an example architecture in accordance with the present disclosure.

FIG. 2A illustrates an example architecture where a plurality of servers 204 are connected to ToRs 203 in each rack. The ToRs 203 may be connected to a plurality of Tier1 switches 202 in a Clos configuration. If there are 8 Tier1 202 switches, then each ToR 203 will connect at least once to all 8 Tier1 202 switches. The Tier1 switches 202 may then connected in a Clos configuration to some number of Tier2 switches 201.

Figure 2B:
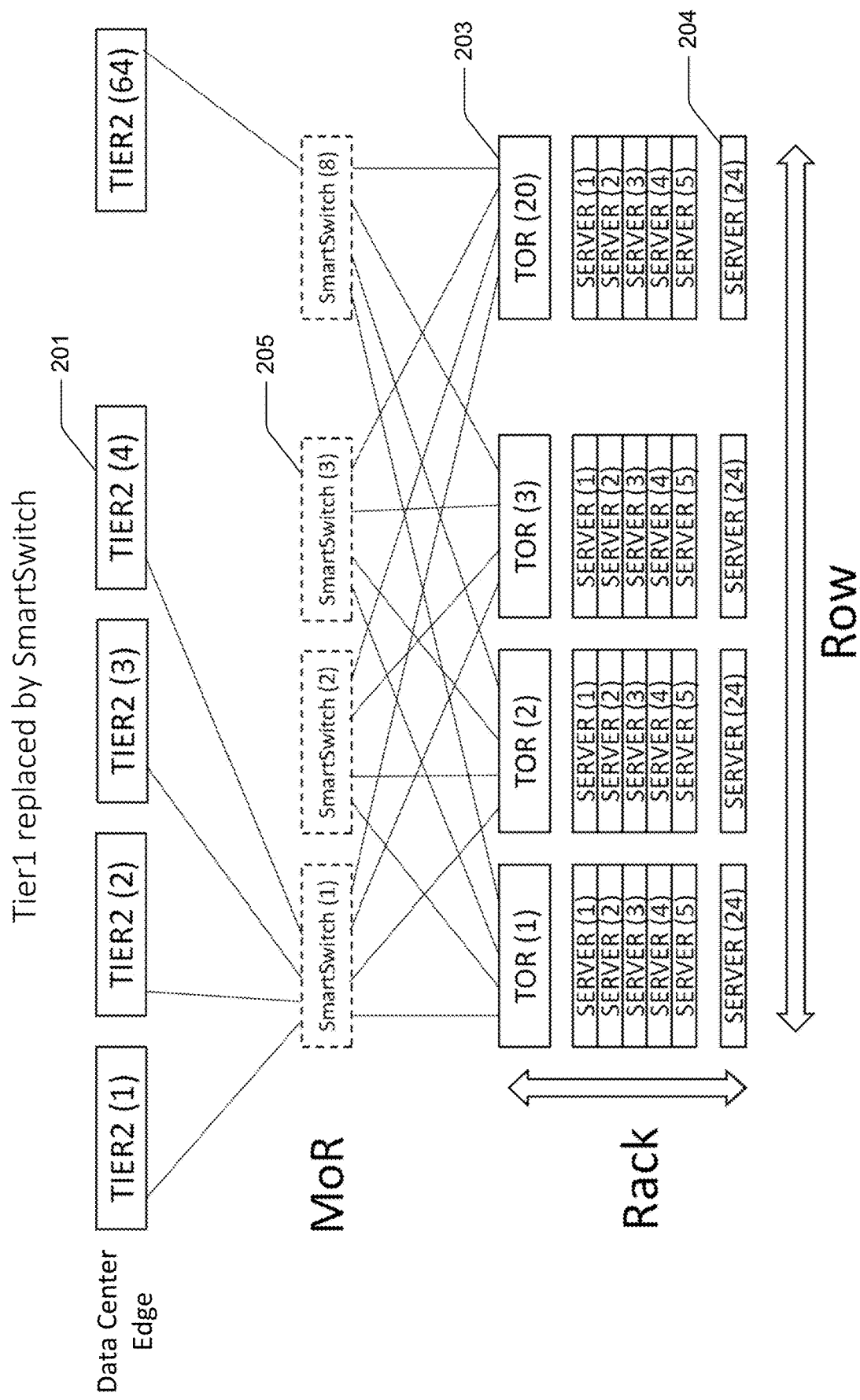
FIG. 2B is a diagram illustrating an example architecture in accordance with the present disclosure.

FIG. 2B illustrates an example where the Tier1 202 switches are replaced with SmartSwitches 205. In some implementations, Tier1 may also be referred to as Middle-of-Rack (MoR). The servers thus each have access to SmartSwitches 205 while bypassing processing at the local host. In typical scenarios, most VM traffic do not require offloaded tasks for processing by SmartSwitches 205 and are processed locally. Thus only VM traffic that requires high connections per second (CPS) need be sent directly to the SmartSwitches 205.

Figure 2C:
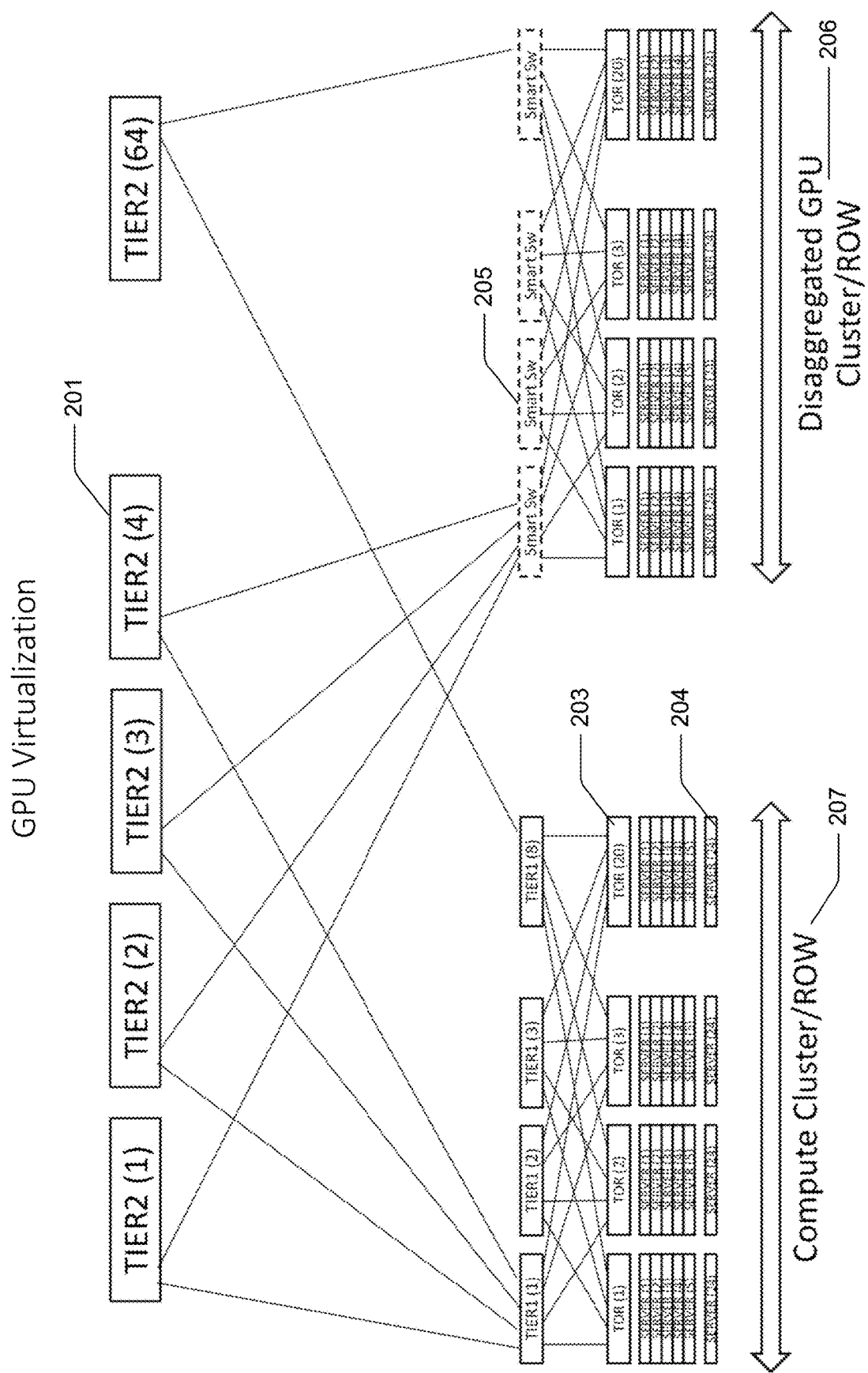
FIG. 2C is a diagram illustrating an example architecture in accordance with the present disclosure.

FIG. 2C illustrates an example where the SmartSwitches 205 enable disaggregated GPU virtualization in a cluster, illustrating that new cluster types may be identified to further deploy SmartSwitches to create new services. The GPU cluster may benefit from having its own dedicated SmartSwitch cluster 206 in the Tier1/Tier0 architecture. By locating SmartSwitches 205 at the Tier1/Tier0 part of the network in the cluster, any VM in the compute cluster 207 can access SmartSwitch cluster 206.

Figure 2D:
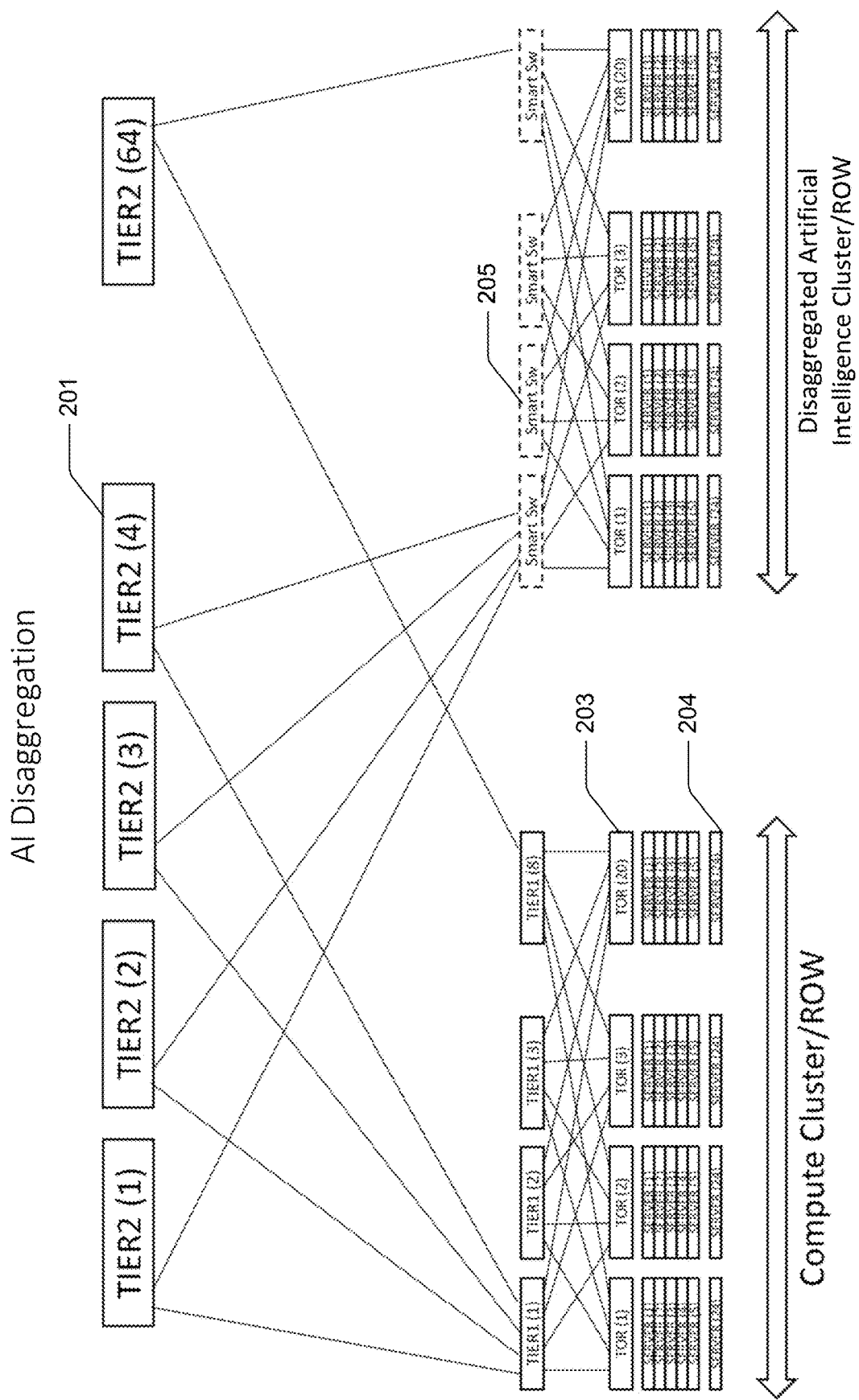
FIG. 2D is a diagram illustrating an example architecture in accordance with the present disclosure.
Figure 2E:
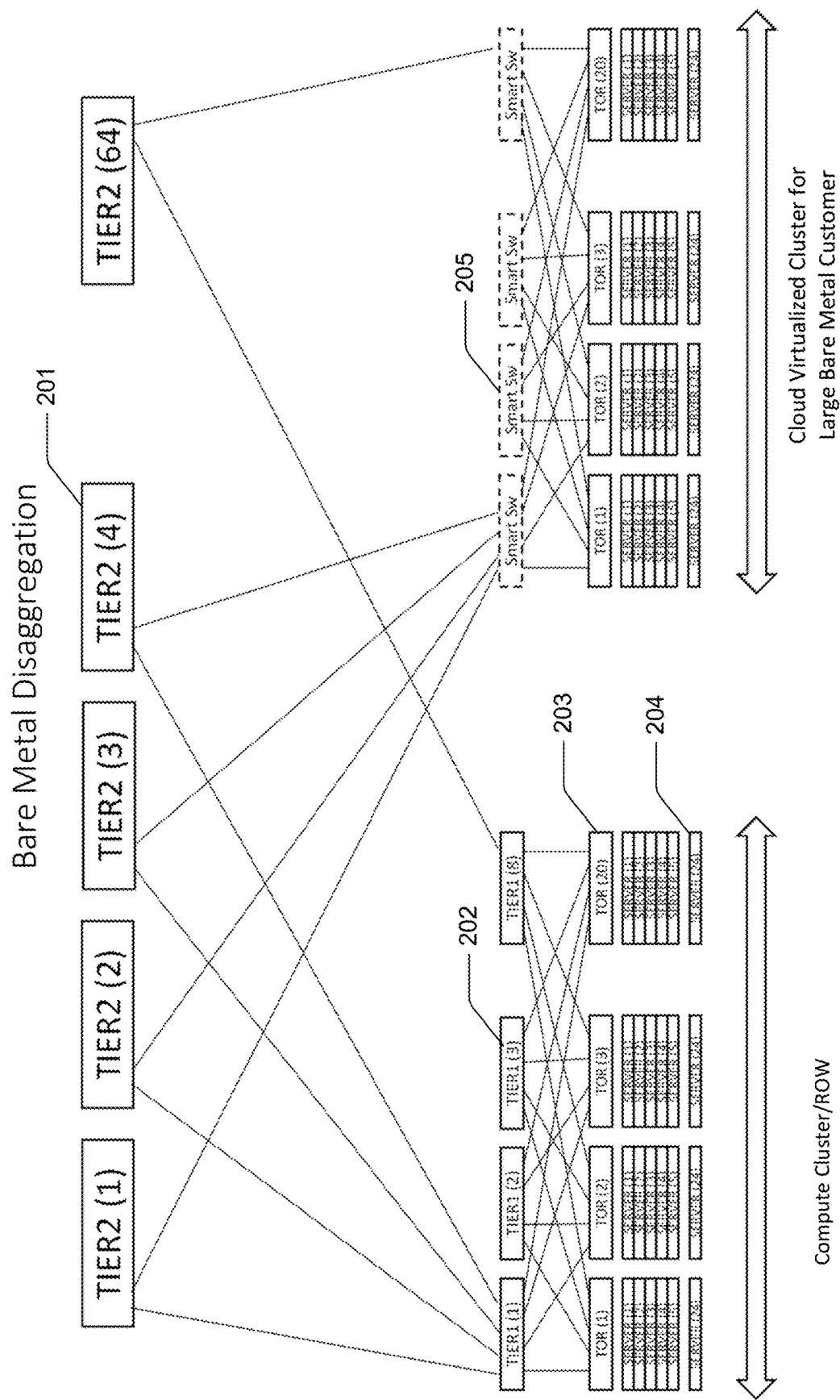
FIG. 2E is a diagram illustrating an example architecture in accordance with the present disclosure.
Figure 2F:
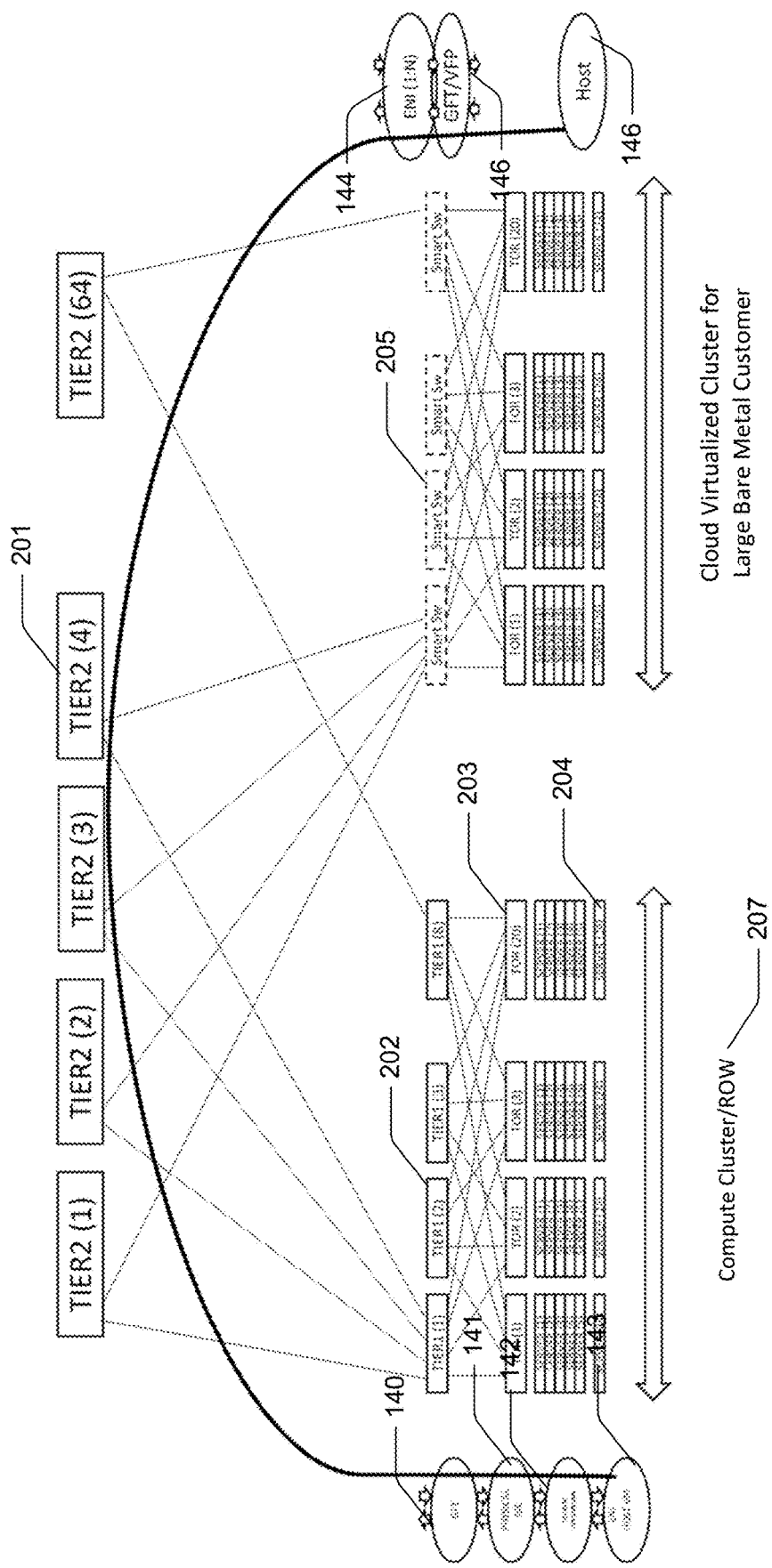
FIG. 2F is a diagram illustrating an example architecture in accordance with the present disclosure.

FIG. 2D illustrates an example where the SmartSwitches 205 enable AI disaggregation in a manner similar to GPU disaggregation in FIG. 2C. FIGS. 2E and 2F illustrates an example where the SmartSwitches 205 enable bare metal disaggregation. FIG. 2F further illustrates that traffic from hosts in compute cluster 207 may be tunneled to interfaces at ENI 144, allowing for offloaded packet processing to be performed by SmartSwitches 205.

The example of FIG. 2F further illustrates the advantages of placing the SmartSwitches 205 at the Tier1 level. As shown, each port on a Tier 2 switch represents connectivity to an entire compute cluster, whereas such a blast radius per port does not exist at the Tier1 level. However, placing the SmartSwitches 205 at the Tier0 level, would result in overcapacity. Thus, Tier1 placement allows for an efficient balance between capacity and fault tolerance.

Figure 3:
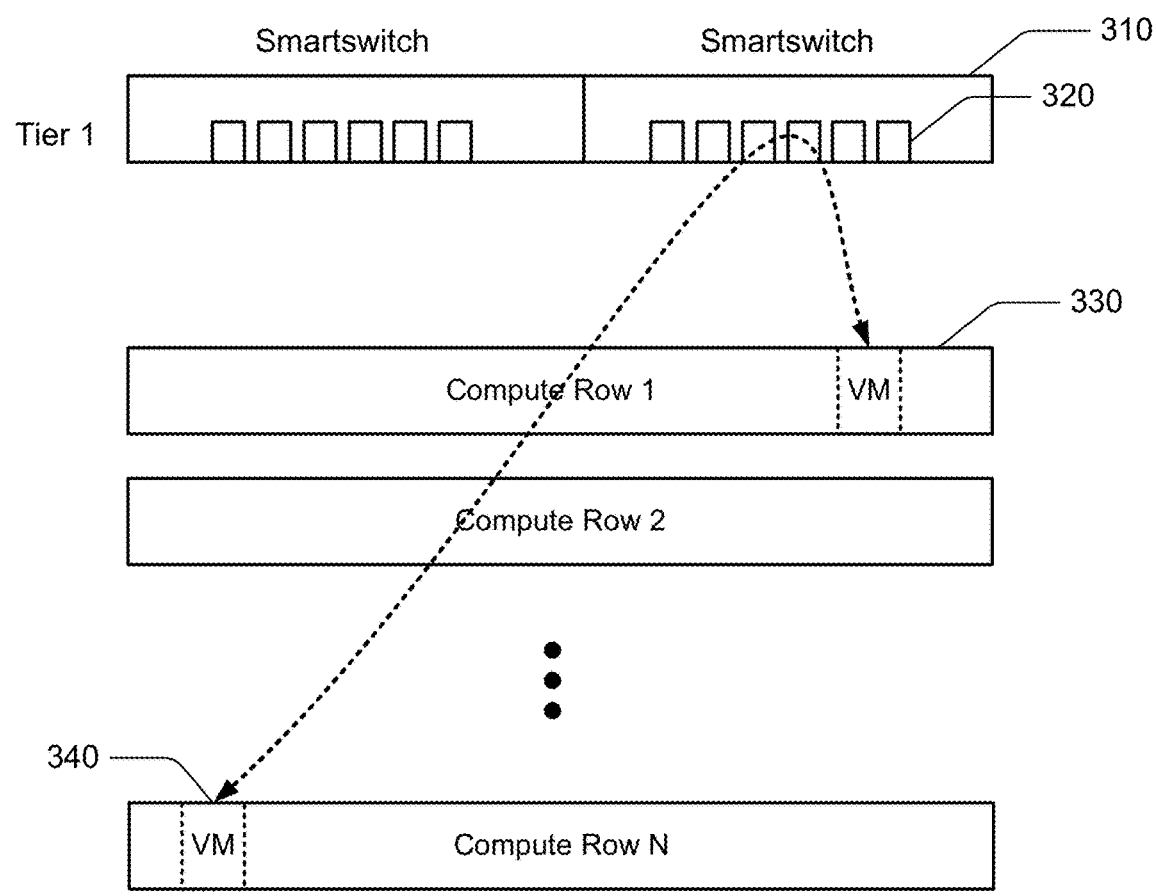
FIG. 3 is a diagram illustrating an example architecture in accordance with the present disclosure.

With reference to FIG. 3, illustrated is an example of a rack 300 with two SmartSwitches 310 having one or more smart NICs 320 and a plurality of compute rows 330 having servers. Any virtual machine 340 running on any server in the data center smart rack can utilize the SmartSwitches 310. For example, virtual machines with a high connections per second (CPS) or flow scale needs can send flows through the SmartSwitches. The SmartSwitches may be configured to perform SDN data path functions at a significantly faster rate as compared to conventional methods.

Figure 4:
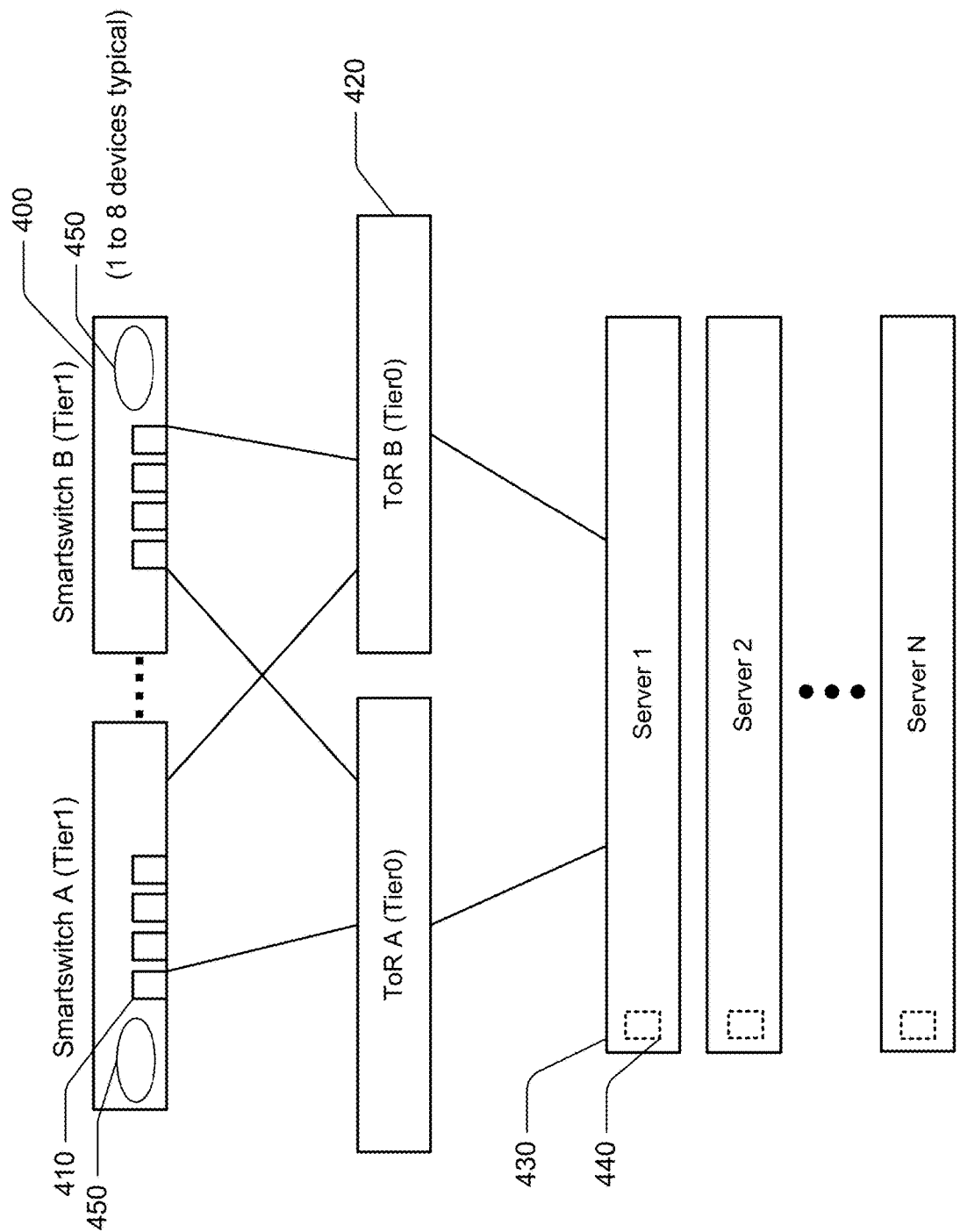
FIG. 4 is a diagram illustrating an example architecture in accordance with the present disclosure.

With reference to FIG. 4, illustrated is an example of SDN disaggregation where non-compute functionality is removed off the compute host. In one implementation, smartNICs 410 may be included in SmartSwitches 400. In an embodiment, the SmartSwitches 400 may be cost optimized. The SmartSwitches 400 may be configured to perform all SDN data path functions. In this and other figures herein, the dashed line indicates skinny NICs 440 and the solid line indicates smartNICs 410. The skinny NICs 440 may be implemented on the servers 430 for low function, cost, and low power.

FIG. 4 illustrates an example of a fault tolerant scheme that is resilient to a single failure. Each SmartSwitch 400 is cross-connected to each Tier0 ToR 420. In an embodiment, at least two SmartSwitches 400 may use connection state replication. In an embodiment, at least two Tier0 ToRs 420 may use connection state replication. In one example, 2-4 SmartNICs 440 per SmartSwitch may be implemented depending on the load. In an embodiment, each ToR 420 may be fully connected to every SmartSwitch 400. For example, each SmartSwitch 400 may provide two redundant 40 G bump-in-wire SDNs. The servers 430 may have dual ported skinny NICs 440. In an embodiment, SDN agents 450 may execute on the SmartSwitches 400. In an embodiment, one to eight SmartSwitches 400 may be implemented at the Tier1 level.

Figure 5:
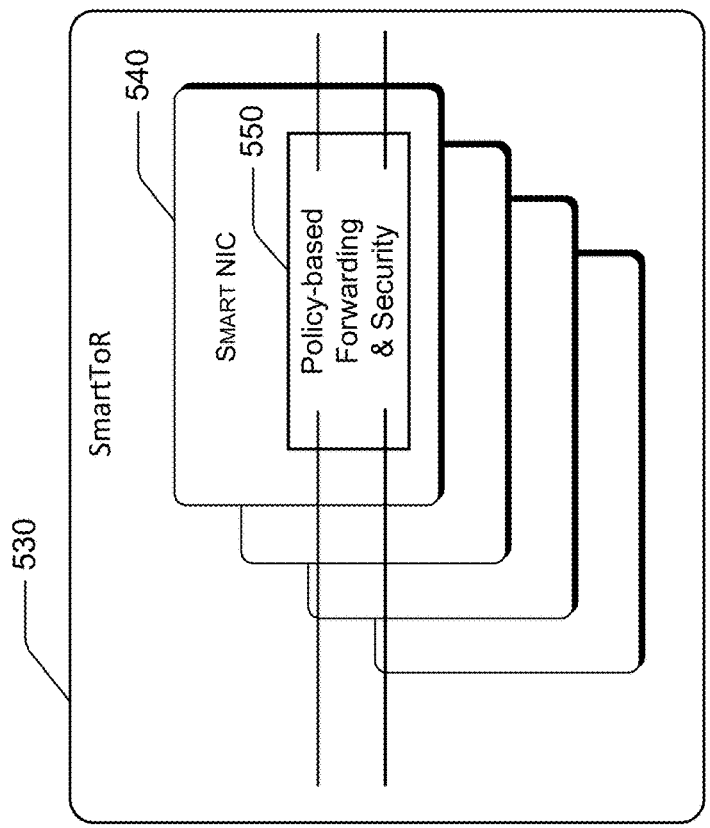
FIG. 5 is a diagram illustrating an example architecture in accordance with the present disclosure.
Figure 5:
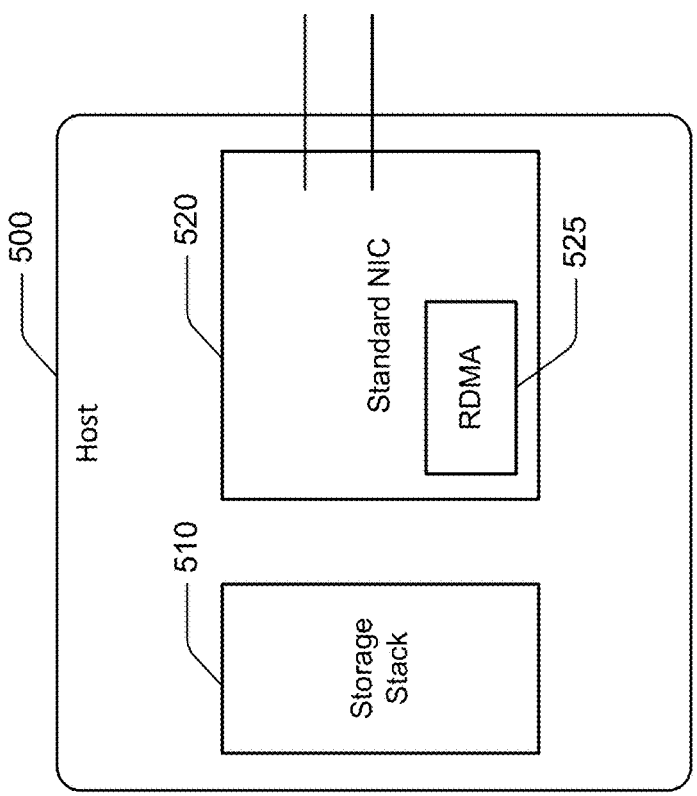

With reference to FIG. 5, the left side of the figure shows a skinny or standard NIC 520 that provides RDMA offload functionality 525 and connectivity to the appliance. Networking traffic may be tunneled to the appliance 530. The right side of the figure shows stateful network policy-based forwarding and security 550 performed on SmartNICs 540.

Figure 6A:
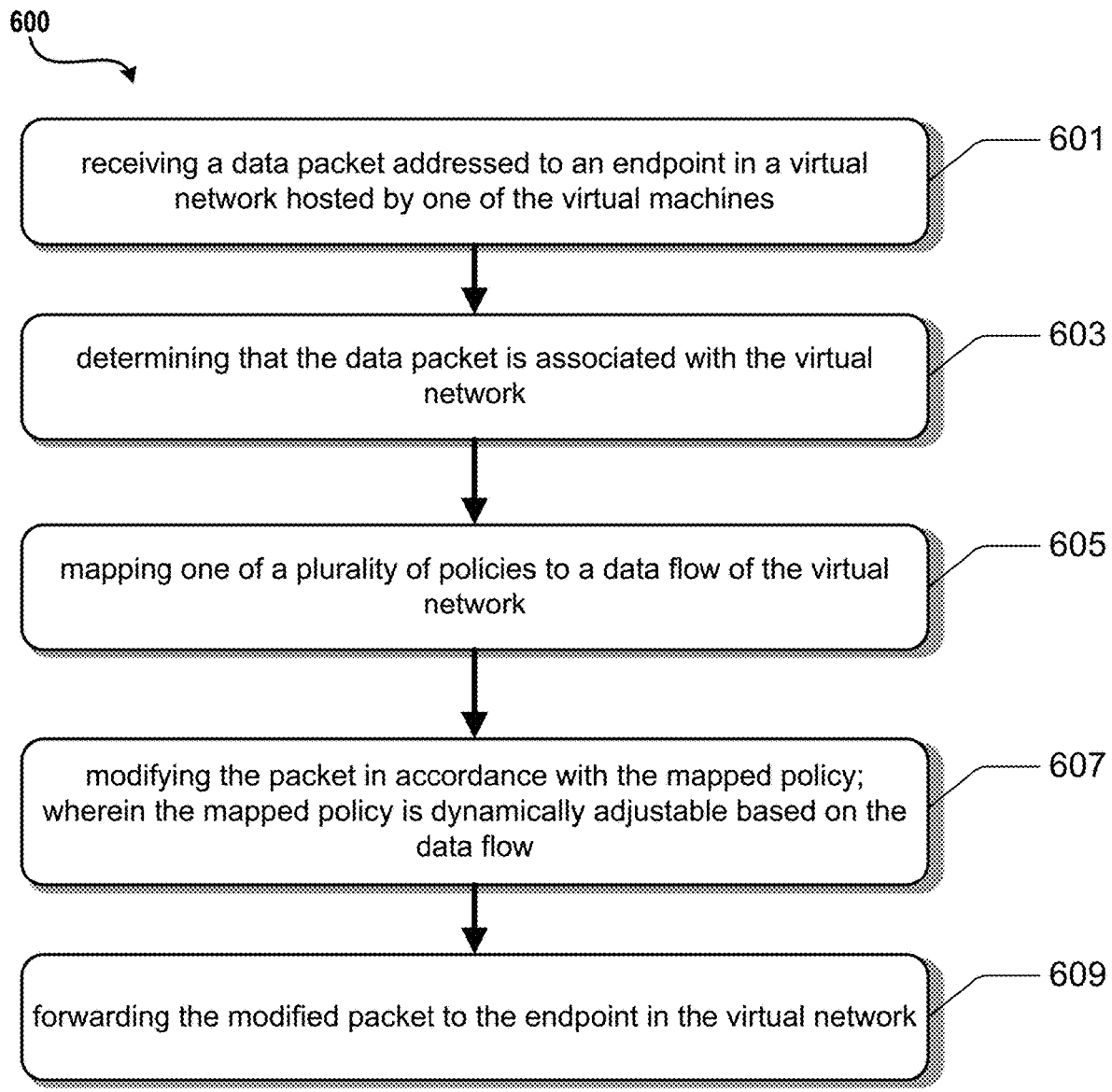
FIG. 6A is a flowchart depicting an example procedure in accordance with the present disclosure.

Turning now to FIG. 6A, illustrated is an example operational procedure for processing data packets and implementing policies in a software defined network (SDN) of a virtual computing environment, by at least one SmartSwitch network device configured to disaggregate enforcement of policies of the SDN from hosts of the virtual computing environment. In an embodiment, the hosts may be implemented on servers communicatively coupled to network interfaces of the SmartSwitch network device. In an embodiment, the servers may host a plurality of virtual machines. In an embodiment, the SmartSwitch network device comprises a plurality of smart network interface cards (sNICs) configured to implement functionality of the SmartSwitch network device. In an embodiment, the SmartSwitch network device is situated at a tier-1 position in the virtual computing environment. Such an operational procedure can be provided by one or more components illustrated in FIGS. 1 through 5. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 600 is described as running on a system, it can be appreciated that the routine 600 and other operations described herein can be executed on an individual computing device or several devices.

Referring to FIG. 6, operation 601 illustrates receiving, at the SmartSwitch network device from a device that is remote from the virtual computing environment, a data packet addressed to an endpoint in a virtual network hosted by one of the virtual machines. In an embodiment, the data packet comprises an identifier indicative of the remote device.

Operation 601 may be followed by operation 603. Operation 603 illustrates based on the identifier, determining that the data packet is associated with the virtual network.

Operation 603 may be followed by operation 605. Operation 605 illustrates based on the determined association, mapping one of a plurality of policies to a data flow of the virtual network.

Operation 605 may be followed by operation 607. Operation 607 illustrates modifying, by the SDN appliance, the packet in accordance with the mapped policy; wherein the mapped policy is dynamically adjustable based on the data flow.

Operation 607 may be followed by operation 609. Operation 609 illustrates forwarding the modified packet to the endpoint in the virtual network.

Figure 6B:
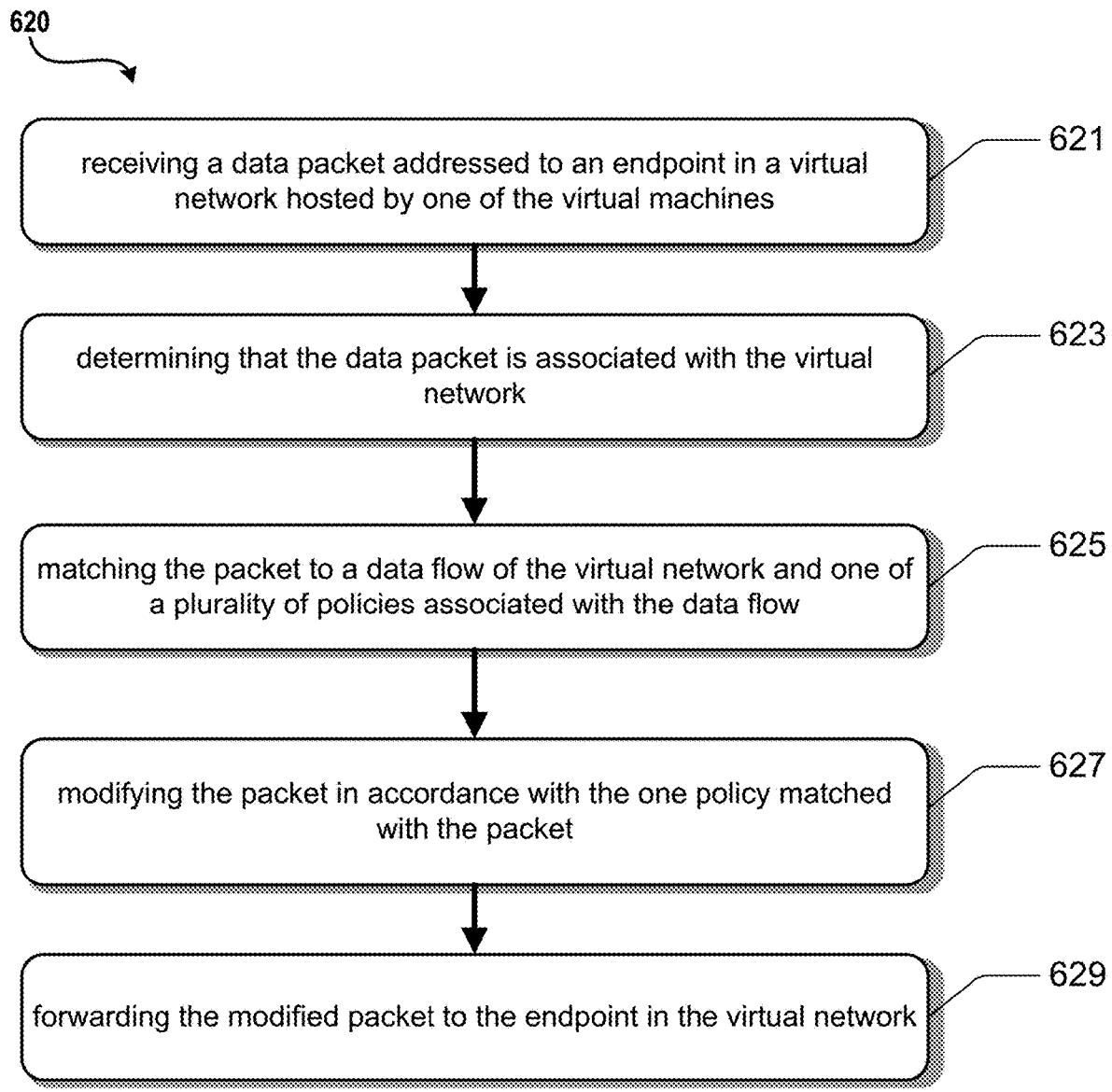
FIG. 6B is a flowchart depicting an example procedure in accordance with the present disclosure.

Turning now to FIG. 6B, illustrated is another example operational procedure for processing data packets and implementing policies in a software defined network (SDN) of a virtual computing environment, by at least one SmartSwitch network device configured to disaggregate enforcement of policies of the SDN from hosts of the virtual computing environment. The hosts may be implemented on servers communicatively coupled to network interfaces of the SmartSwitch network device. The servers may host a plurality of virtual machines The SmartSwitch network device may comprise a plurality of data processing units configured to implement functionality of the SmartSwitch network device. In an embodiment, the SmartSwitch network device may be situated at a tier-1 position in the virtual computing environment.

Referring to FIG. 6B, operation 621 illustrates receiving, by the SmartSwitch network device, a data packet addressed to an endpoint in a virtual network hosted by one of the virtual machines.

Operation 621 may be followed by operation 623. Operation 623 illustrates determining that the data packet is associated with the virtual network.

Operation 623 may be followed by operation 625. Operation 625 illustrates in response to determining that the data packet is associated with the virtual network, matching the packet to a data flow of the virtual network and one of a plurality of policies associated with the data flow.

Operation 625 may be followed by operation 627. Operation 627 illustrates modifying, by the SmartSwitch network device, the packet in accordance with the one policy matched with the packet; wherein the one policy matched with the packet is dynamically adjustable based on the data flow.

Operation 627 may be followed by operation 629. Operation 629 illustrates forwarding the modified packet to the endpoint in the virtual network.

Figure 7:
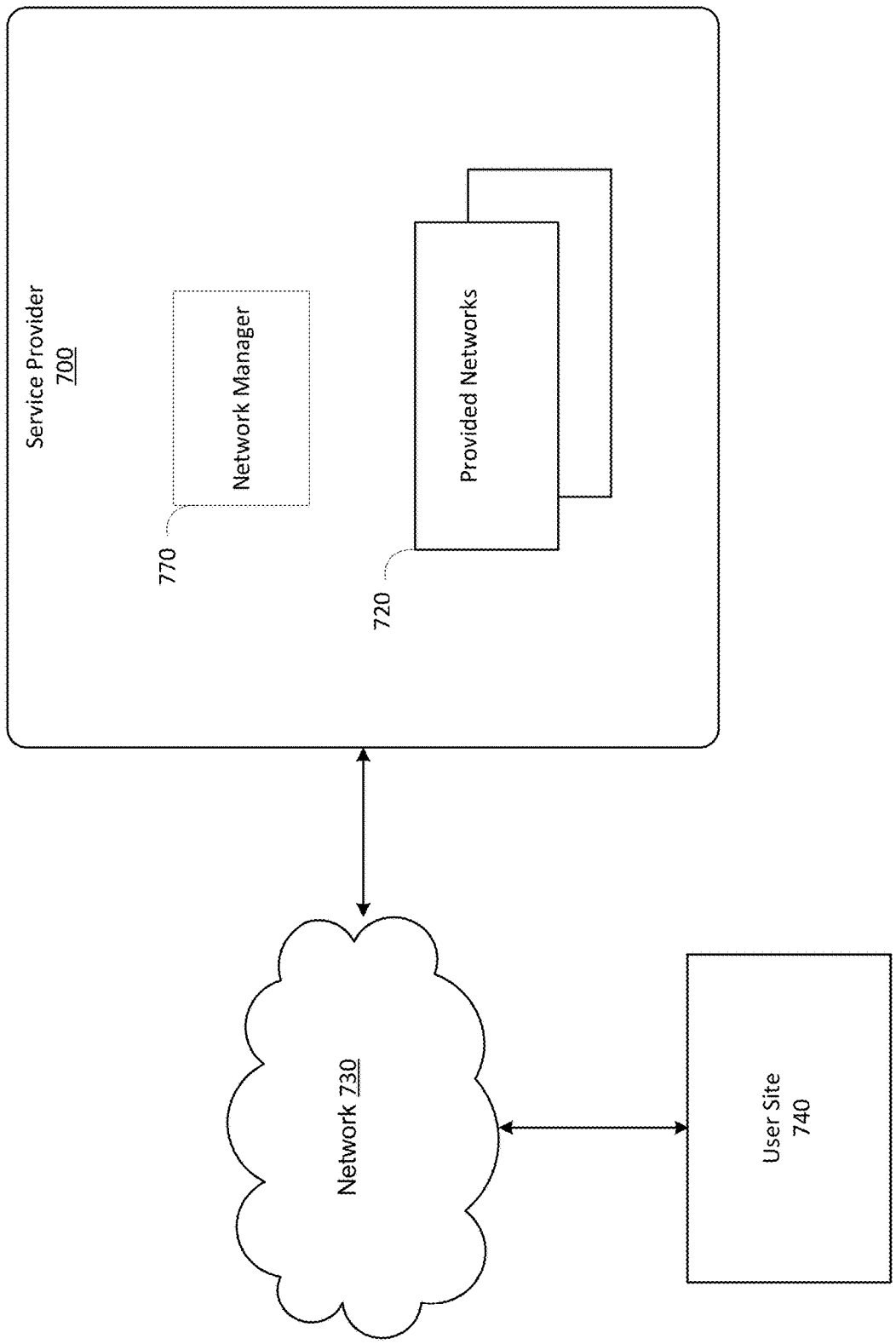
FIG. 7 is a diagram illustrating a data center in accordance with the present disclosure.

FIG. 7 illustrates an example computing environment in which the embodiments described herein may be implemented. FIG. 7 illustrates a service provider 700 that is configured to provide computing resources to users at user site 740. The user site 740 may have user computers that may access services provided by service provider 700 via a network 730. The computing resources provided by the service provider 700 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 700 may have various computing resources including servers, routers, and other devices that may provide remotely accessible computing and network resources using, for example, virtual machines. Other resources that may be provided include data storage resources. Service provider 700 may also execute functions that manage and control allocation of network resources, such as a network manager 770.

Network 730 may, for example, be a publicly accessible network of linked networks and may be operated by various entities, such as the Internet. In other embodiments, network 730 may be a private network, such as a dedicated network that is wholly or partially inaccessible to the public. Network 730 may provide access to computers and other devices at the user site 740.

Figure 8:
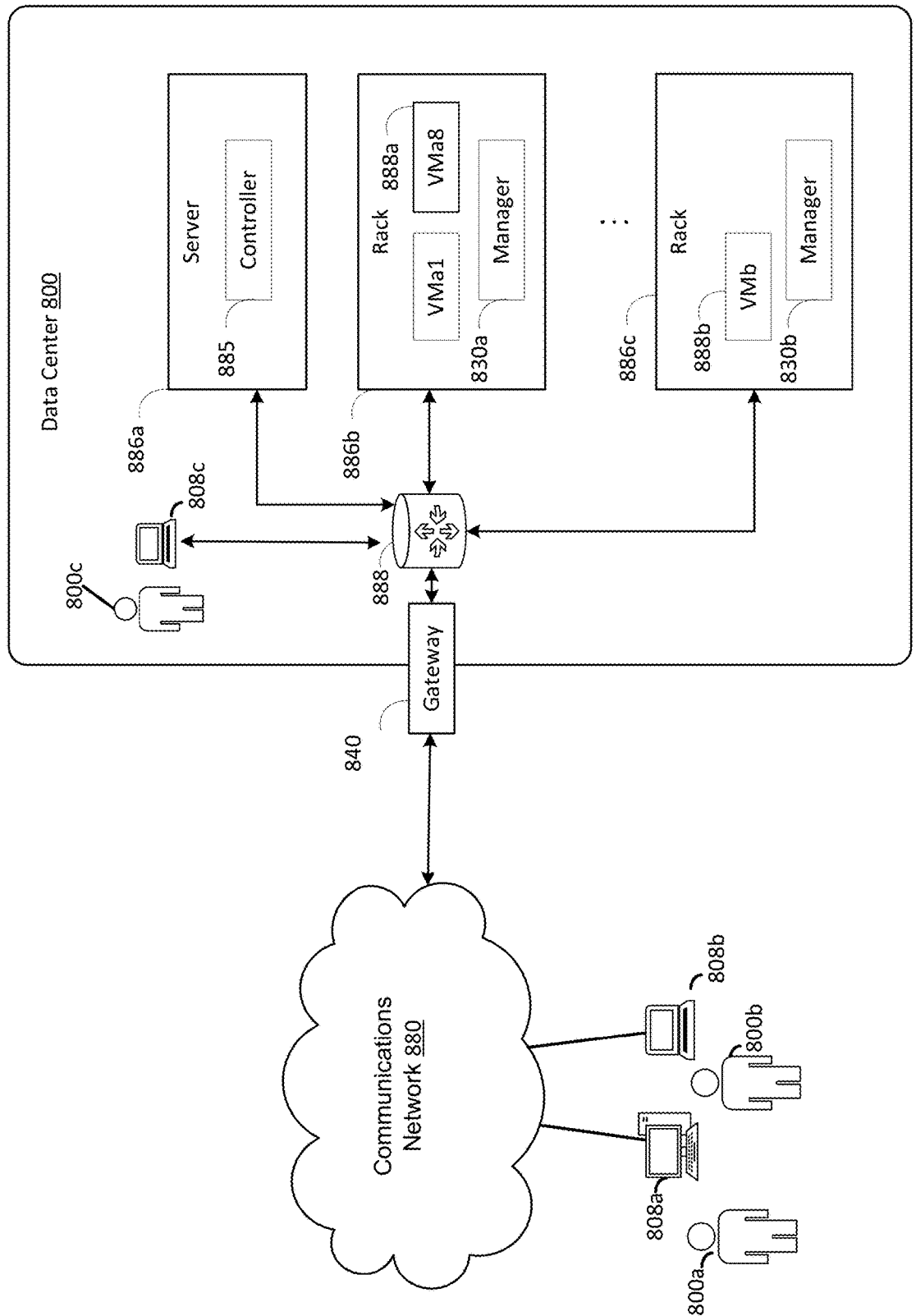
FIG. 8 is a diagram illustrating a data center in accordance with the present disclosure.

FIG. 8 illustrates an example computing environment in which the embodiments described herein may be implemented. FIG. 8 illustrates a data center 800 that is configured to provide computing resources to users 800*a*, 800*b*, or 800*c* (which may be referred herein singularly as "a user 800" or in the plural as "the users 800") via user computers 808*a*, 808*b*, and 808*c* (which may be referred herein singularly as "a computer 808" or in the plural as "the computers 808") via a communications network 880. The computing resources provided by the data center 800 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 800 may correspond to service provider 100 in FIGS. 1 and 8, or edge site 150 of FIG. 8. Data center 800 may include servers 886*a*, 886*b*, and 886*c* (which may be referred to herein singularly as "a server 886" or in the plural as "the servers 886") that may be standalone or installed in server racks, and provide computing resources available as virtual machines 888*a* and 888*b* (which may be referred to herein singularly as "a virtual machine 888" or in the plural as "the virtual machines 888"). The virtual machines 888 may be configured to execute applications such as Web servers, application servers, media servers, database servers, and the like. Other resources that may be provided include data storage resources (not shown on FIG. 8) and may include file storage devices, block storage devices, and the like. Servers 886 may also execute functions that manage and control allocation of resources in the data center, such as a controller 885. Controller 885 may be a fabric controller or another type of program configured to manage the allocation of virtual machines on servers 886.

Referring to FIG. 8, communications network 880 may, for example, be a publicly accessible network of linked networks and may be operated by various entities, such as the Internet. In other embodiments, communications network 880 may be a private network, such as a corporate network that is wholly or partially inaccessible to the public.

Communications network 880 may provide access to computers 808. Computers 808 may be computers utilized by users 800. Computer 808*a*, 808*b* or 808*c* may be a server, a desktop or laptop personal computer, a tablet computer, a smartphone, a set-top box, or any other computing device capable of accessing data center 800. User computer 808*a* or 808*b* may connect directly to the Internet (e.g., via a cable modem). User computer 808*c* may be internal to the data center 800 and may connect directly to the resources in the data center 800 via internal networks. Although only three user computers 808*a*, 808*b*, and 808*c* are depicted, it should be appreciated that there may be multiple user computers.

Computers 808 may also be utilized to configure aspects of the computing resources provided by data center 800. For example, data center 800 may provide a Web interface through which aspects of its operation may be configured through the use of a Web browser application program executing on user computer 808. Alternatively, a stand-alone application program executing on user computer 808 may be used to access an application programming interface (API) exposed by data center 800 for performing the configuration operations.

Servers 886 may be configured to provide the computing resources described above. One or more of the servers 886 may be configured to execute a manager 830*a* or 830*b* (which may be referred herein singularly as "a manager 830" or in the plural as "the managers 830") configured to execute the virtual machines. The managers 830 may be a virtual machine monitor (VMM), fabric controller, or another type of program configured to enable the execution of virtual machines 888 on servers 886, for example.

It should be appreciated that although the embodiments disclosed above are discussed in the context of virtual machines, other types of implementations can be utilized with the concepts and technologies disclosed herein.

In the example data center 800 shown in FIG. 8, a network device 888 may be utilized to interconnect the servers 886a and 886b. Network device 888 may comprise one or more switches, routers, or other network devices. Network device 888 may also be connected to gateway 840, which is connected to communications network 880. Network device 888 may facilitate communications within networks in data center 800, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 800 described in FIG. 8 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 9:
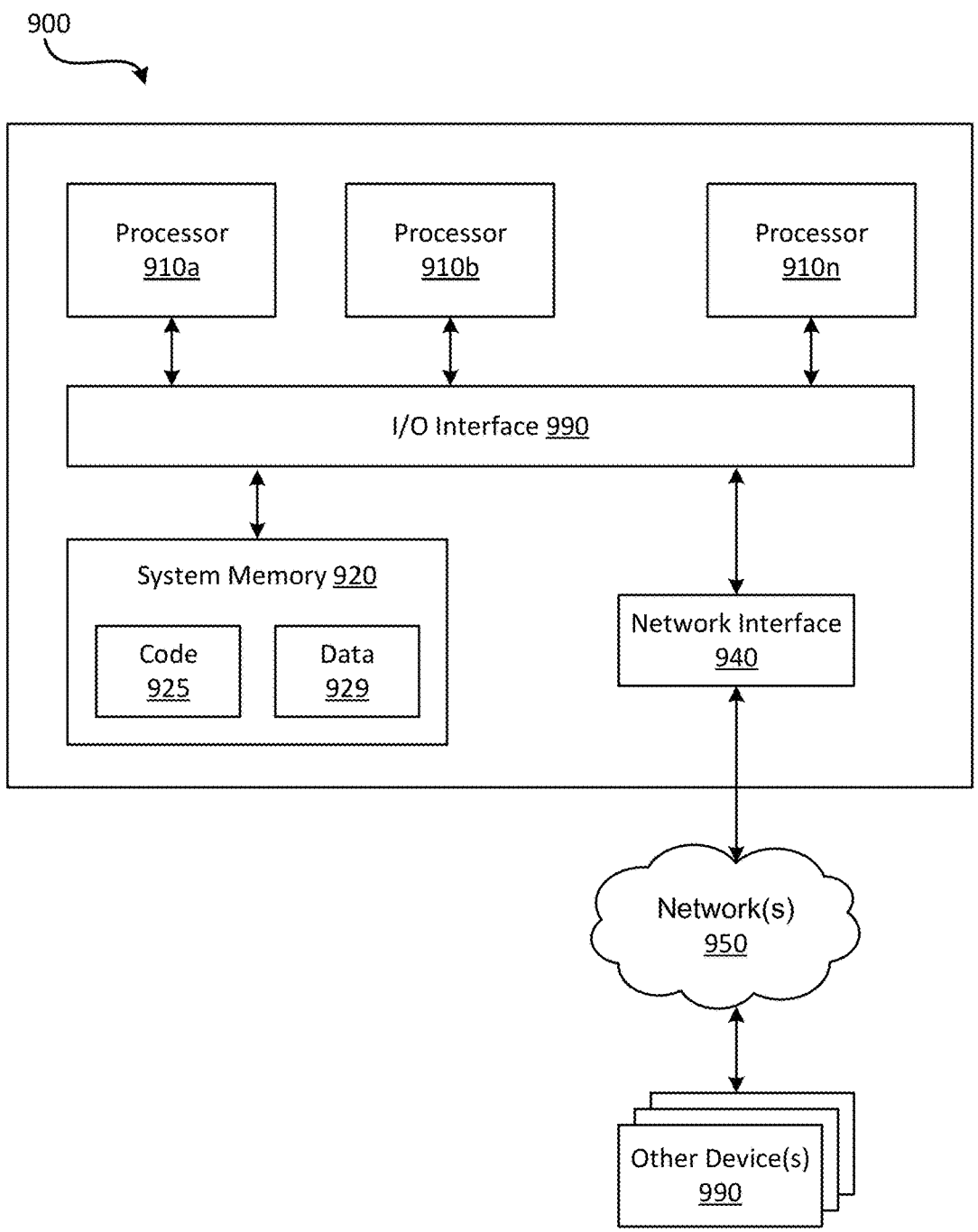
FIG. 9 is an example computing system in accordance with the present disclosure.

FIG. 9 illustrates a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 99 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x99, PowerPC, SPARC, or MIPS ISAs, or any other suitable ISA. In multiprocessor systems, each of processors 910 may commonly, but not necessarily, implement the same ISA.

System memory 99 may be configured to store instructions and data accessible by processor(s) 910. In various embodiments, system memory 99 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 925 and data 929.

In one embodiment, I/O interface 930 may be configured to coordinate I/O traffic between the processor 910, system memory 99, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of I/O interface 930, such as an interface to system memory 920, may be incorporated directly into processor 910.

Network interface 940 may be configured to allow data to be exchanged between computing device 900 and other device or devices 990 attached to a network or network(s) 990, such as other computer systems or devices as illustrated in FIGS. 1 through 5, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 920 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for processing data packets and implementing policies in a software defined network (SDN) of a virtual computing environment, by at least one SmartSwitch network device configured to disaggregate enforcement of policies of the SDN from hosts of the virtual computing environment, the hosts implemented on servers communicatively coupled to network interfaces of the SmartSwitch network device, the servers hosting a plurality of virtual machines, the SmartSwitch network device comprising a plurality of data processing units configured to implement functionality of the SmartSwitch network device, the SmartSwitch network device situated at a tier-1 position in the virtual computing environment, the method comprising:
  receiving, by the SmartSwitch network device, a data packet addressed to an endpoint in a virtual network hosted by one of the virtual machines;
  determining that the data packet is associated with the virtual network;
  in response to determining that the data packet is associated with the virtual network, matching the packet to a data flow of the virtual network and one of a plurality of policies associated with the data flow;
  modifying, by the SmartSwitch network device, the packet in accordance with the one policy matched with the packet; wherein the one policy matched with the packet is dynamically adjustable based on the data flow; and
  forwarding the modified packet to the endpoint in the virtual network.

Clause 2: The method of clause 1, wherein the SmartSwitch network device is interconnected in a Clos configuration with tier-0 network devices.

Clause 3: The method of any of clauses 1-2, wherein the SmartSwitch network device is communicatively coupled to at least two top-of-rack switches that are situated in tier-0 positions in the virtual computing environment.

Clause 4: The method of any of clauses 1-3, wherein the SmartSwitch network device is part of a disaggregated cluster of computing devices.

Clause 5: The method of any of clauses 1-4, wherein the disaggregated cluster is a GPU cluster, bare metal cluster, or AI cluster.

Clause 6: The method of any of clauses 1-5, wherein the SmartSwitch network devices are communicatively coupled to a plurality of switches at a tier-2 position in the virtual computing environment.

Clause 7: A system comprising:
  a plurality of servers communicatively coupled to at least one SmartSwitch network device configured to disaggregate enforcement of policies of a SDN of a virtual computing environment from hosts of the virtual computing environment, the hosts implemented on servers communicatively coupled to network interfaces of the SmartSwitch network device, the servers hosting a plurality of virtual machines, the SmartSwitch network device comprising a plurality of hardware-based processing units configured to implement functionality of the SmartSwitch network device, the SmartSwitch network device situated at a tier-1 position in the virtual computing environment;
  the system configured to:
  receive a data packet addressed to an endpoint in a virtual network hosted by one of the virtual machines, the data packet comprising an identifier indicative of a source and destination of the data packet;
  based on the identifier:
  determining that the data packet is associated with the virtual network; and
  based on the determining that the data packet is associated with the virtual network, matching the data packet to one of a plurality of policies associated with a data flow of the virtual network;
  modifying the data packet in accordance with the matched policy; wherein the matched policy is dynamically adjustable based on the data flow; and
  forwarding the modified packet to the endpoint in the virtual network.

Clause 8: The system of clause 7, wherein the SmartSwitch network device is interconnected in a Clos configuration with tier-0 network devices.

Clause 9: The system of any of clauses 7 and 8, wherein the SmartSwitch network device is communicatively coupled to at least two top-of-rack switches.

Clause 10: The system of any clauses 7-9, wherein the SmartSwitch network device is a part of a disaggregated cluster.

Clause 11: The hardware-based networking device of any clauses 7-10, wherein the disaggregated cluster is a GPU cluster, bare metal cluster, or AI cluster.

Clause 12: The hardware-based networking device of any clauses 7-11, wherein the SmartSwitch network device is configured to apply policies of the virtual computing environment to data traffic on the virtual network after the data traffic leaves its source and before the data traffic reaches its destination.

Clause 13: A network device configured to disaggregate enforcement of policies of a software defined network (SDN) of a virtual computing environment from hosts of the virtual computing environment, the hosts implemented on servers communicatively coupled to network interfaces of the network device, the servers hosting a plurality of virtual machines, the network device comprising a plurality of processing units configured to implement functionality of the network device, the network device configured to be situated at a tier-1 position in the virtual computing environment, the network device configured to:
- receive a data packet addressed to an endpoint in a virtual network hosted by one of the virtual machines;
- determining that the data packet is associated with the virtual network; and
- based on determining that the data packet is associated with the virtual network, matching the data packet to one of a plurality of policies associated with a data flow of the virtual network;
- modifying the packet in accordance with the matched policy; wherein the matched policy is dynamically adjustable based on the data flow; and
- forwarding the modified packet to the endpoint in the virtual network.

Clause 14: The network device of clause 13, wherein the network device is interconnected in a Clos configuration with tier-0 network devices.

Clause 15: The network device of any of clauses 13 and 14, wherein the network device is communicatively coupled to at least two top-of-rack switches.

Clause 16: The network device of any of the clauses 13-15, wherein the network device is a part of a disaggregated cluster.

Clause 17: The network device of any of the clauses 13-16, wherein the disaggregated cluster is a GPU cluster, bare metal cluster, or AI cluster.

Clause 18: The network device of any of the clauses 13-17, wherein the network device is configured to apply policies of the virtual computing environment to data traffic on the virtual network after the data traffic leaves its source and before the data traffic reaches its destination.

Clause 19: The network device of any of the clauses 13-18, wherein the network device is communicatively coupled to two top-of-rack switches so that each of the of-rack switches have a switchable communications path to the network device.

Clause 20: The network device of any of the clauses 13-19, wherein the network device is configured with SDN agents configured to manage functionality of the network device.

What is claimed is:

1. A method for processing data packets and implementing policies in a software defined network (SDN) of a virtual computing environment, the method comprising:
- receiving, by a SmartSwitch network switch device, a data packet addressed to an endpoint in a virtual network hosted by one of a plurality of virtual machines of the virtual computing environment, the SmartSwitch network switch device configured to disaggregate enforcement of policies of the SDN from servers hosting the virtual machines, the servers communicatively coupled to network interfaces of the SmartSwitch network switch device, the SmartSwitch network switch device comprising a plurality of data processing units configured to implement functionality of the SmartSwitch network switch device, the SmartSwitch network switch device interconnected in a Clos configuration and situated at a tier-1 switch position in the SDN;
- determining that the data packet is associated with the virtual network;
- in response to determining that the data packet is associated with the virtual network, matching the packet to a data flow of the virtual network and one of a plurality of policies associated with the data flow;
- modifying, by the SmartSwitch network switch device, the packet by applying the one policy to the packet; wherein the one policy matched with the packet is dynamically adjustable based on the data flow; and
- forwarding the modified packet to the endpoint in the virtual network.

2. The method of claim 1, wherein the SmartSwitch network switch device is interconnected with tier-0 network devices.

3. The method of claim 1, wherein the SmartSwitch network switch device is communicatively coupled to at least two top-of-rack switches that are situated in tier-0 positions in the virtual computing environment.

4. The method of claim 1, wherein the SmartSwitch network switch device is part of a disaggregated cluster of computing devices.

5. The method of claim 4, wherein the disaggregated cluster is a GPU cluster, bare metal cluster, or AI cluster.

6. The method of claim 1, wherein the SmartSwitch network switch devices are communicatively coupled to a plurality of switches at a tier-2 position in the virtual computing environment.

7. A system comprising:
- a plurality of servers communicatively coupled to at least one SmartSwitch network switch device configured to disaggregate enforcement of policies of a SDN of a virtual computing environment from servers hosting a plurality of virtual machines, the SmartSwitch network switch device comprising a plurality of data processing units configured to implement functionality of the SmartSwitch network switch device, the SmartSwitch network switch device interconnected in a Clos configuration and situated at a tier-1 position in the SDN;
- the SmartSwitch network switch device configured to:
- receive a data packet addressed to an endpoint in a virtual network hosted by one of the plurality of virtual machines, the data packet comprising an identifier indicative of a source and destination of the data packet;
- based on the identifier:
- determine that the data packet is associated with the virtual network; and
- based on the determining that the data packet is associated with the virtual network, match the data packet to one of a plurality of policies associated with a data flow of the virtual network;
- modify the data packet by applying the one policy to the data packet; wherein the one policy is dynamically adjustable based on the data flow; and
- forward the modified packet to the endpoint in the virtual network.

8. The system of claim 7, wherein the SmartSwitch network switch device is interconnected with tier-0 network devices.

9. The system of claim 7, wherein the SmartSwitch network switch device is communicatively coupled to at least two top-of-rack switches.

10. The system of claim 7, wherein the SmartSwitch network switch device is a part of a disaggregated cluster.

11. The system of claim 10, wherein the disaggregated cluster is a GPU cluster, bare metal cluster, or AI cluster.

12. The system of claim 7, wherein the SmartSwitch network switch device is configured to apply policies of the virtual computing environment to data traffic on the virtual network after the data traffic leaves its source and before the data traffic reaches its destination.

13. A SmartSwitch network switch device configured to disaggregate enforcement of policies of a software defined network (SDN) of a virtual computing environment from servers communicatively coupled to network interfaces of the SmartSwitch network switch device, the servers hosting a plurality of virtual machines, the SmartSwitch network switch device comprising a plurality of data processing units configured to implement functionality of the SmartSwitch network switch device, the SmartSwitch network switch device configured to be interconnected in a Clos configuration and situated at a tier-1 position in the SDN, the plurality of data processing units configuring the SmartSwitch network switch device to perform operations comprising:
- receiving a data packet addressed to an endpoint in a virtual network hosted by one of the plurality of virtual machines;
- determining that the data packet is associated with the virtual network; and
- based on determining that the data packet is associated with the virtual network, matching the data packet to one of a plurality of policies associated with a data flow of the virtual network;
- modifying the packet by applying the one policy to the data packet; wherein the one policy is dynamically adjustable based on the data flow; and
- forwarding the modified packet to the endpoint in the virtual network.

14. The SmartSwitch network switch device of claim 13, wherein the SmartSwitch network switch device is interconnected with tier-0 network devices.

15. The SmartSwitch network switch device of claim 13, wherein the SmartSwitch network switch device is communicatively coupled to at least two top-of-rack switches.

16. The SmartSwitch network switch device of claim 13, wherein the SmartSwitch network switch device is a part of a disaggregated cluster.

17. The SmartSwitch network switch device of claim 16, wherein the disaggregated cluster is a GPU cluster, bare metal cluster, or AI cluster.

18. The SmartSwitch network switch device of claim 13, wherein the SmartSwitch network switch device is configured to apply policies of the virtual computing environment to data traffic on the virtual network after the data traffic leaves its source and before the data traffic reaches its destination.

19. The SmartSwitch network switch device of claim 16, wherein the SmartSwitch network switch device is communicatively coupled to two top-of-rack switches so that each of the of-rack switches have a switchable communications path to the SmartSwitch network switch device.

20. The SmartSwitch network switch device of claim 13, wherein the SmartSwitch network switch device is configured with SDN agents configured to manage functionality of the SmartSwitch network switch device.

* * * * *